Dec. 11, 1928.
A. R. THOMPSON
COMBINED COOKER AND COOLER
Filed Jan. 10, 1921
1,694,996
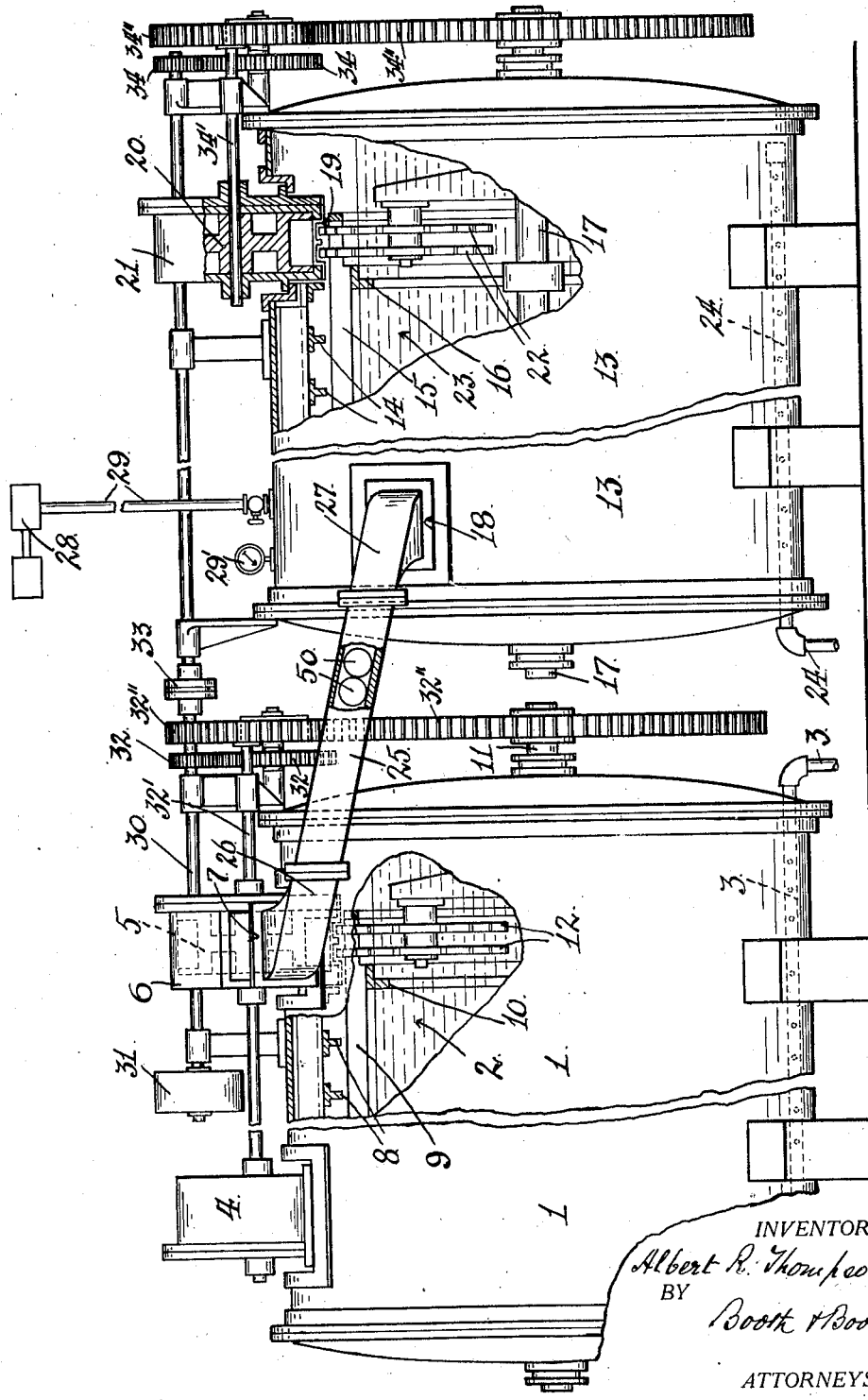
INVENTOR
Albert R. Thompson
BY
Booth & Booth
ATTORNEYS Patented Dec. 11, 1928.

1,694,996

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

COMBINED COOKER AND COOLER.

Application filed January 10, 1921. Serial No. 436,065.

My invention relates to cookers and coolers used in the canning art and particularly to a combined or organized apparatus unit comprising a cooking member, a cooling member, and a communication by or through which the continuity of general operation is preserved.

In the art of sterilizing comestibles it is common practice to subject the filled and sealed containers, while traveling through a definite path in a machine commonly called a "cooker", to a temperature required for preservation, and then, without interrupting the travel, to transfer the containers to and carry them continuously through a path within another machine, similar to the first, but in which the temperature is reduced, and by which the containers are cooled, said second machine being called a "cooler". These two machines are so connected that they constitute practically an organized unit usually termed a combined cooker and cooler. Accepted practice in the canning art favors the "cooking" under a pressure higher than atmospheric, the pressure being the result, in some cases, of confining the steam used or generated in the cooking chamber; or, in other cases, of admitting compressed air to said chamber to enable the heating water to be raised to a high temperature without ebullition. In these cases the cooker is known as a pressure cooker, and it is provided with pressure tight inlet and discharge valves for the admission and delivery of the container-procession, without release of the internal pressure in the cooking chamber. The use of "pressure" cookers, however, when in connection with or followed by a "cooling" effect has demonstrated the necessity of carrying out this cooling effect also under a pressure higher than atmospheric, in order to avoid the tendency of the containers to burst or open their seams, if after being delivered from the pressure cooker, they are at once relieved from high pressure and cooled at atmospheric pressure.

While it is possible to subject the containers to both cooking and cooling effects within a single shell, in which a high pressure is maintained during both effects, I find, in practice, that it is more desirable to continue along the line of a separate cooker and a cooler in combined relation, and to reach the desired result by the provision of a communication between said machines of such a character, that pressure higher than atmospheric may be independently established and maintained in each without interchange.

This is the object of my present invention, the nature of which will be fully ascertained from the following description, reference being had to the accompanying drawings in which the figure is a side elevation, broken away in parts, of my combined cooker and cooler.

1 is the shell, tank or box of the cooker. It is fluid tight and contains a body of water 2, which is heated by a steam pipe 3, in the bottom. At one end it has a can inlet, fitted with a fluid tight rotary can feed valve indicated generally by 4. At its other end it has a can-outlet, controlled by a fluid-tight rotary can-discharge valve 5 in a casing 6, provided with a delivery at 7.

Within the shell 1, is a can-path through which the cans in continuous procession pass from the inlet to the outlet. This path as here indicated is of a well known type, comprising a fixed helically directed rail 8 within which rotate an annular series of rails 9 forming the periphery of a reel 10 mounted upon and rotated by a shaft 11. A rotatable toothed wheel 12 engaged and rotated by the reel rails 9, serves to push the cans up into the rotary discharge valve 5.

All these features are now common construction and my use of them herein is merely to illustrate one form of many types of cookers which may be used in carrying out my invention. In short, they simply serve to show a pressure cooker, without regard to any special details of construction.

13 is a fluid tight shell, tank or box of the cooler. It is, in general, similar in structure to the cooker, being provided with a can path comprising a fixed helical rail 14, and a series of rails 15 carried by a reel 16, mounted on a shaft 17. The cooler shell 13 has near one end an inlet at 18, and at its other end it has an outlet 19, controlled by a rotary fluid tight discharge valve 20 in a casing 21, and fed by a toothed wheel 22, all similar to the discharge valve mechanism of the cooker.

A body of cooling water, indicated by 23 is within the cooler shell, the water being supplied by a feed pipe 24 from a suitable source. In the present case, as a practical and preferred form of communication between the cooker and cooler, I show the following:

25 is a fluid tight conduit, which at one end is joined by a fitting 26 with the delivery 7 of the casing 6 of the discharge valve 5 of the cooker, and at its other end is joined, by a fitting 27 with the inlet 18 of the cooler shell.

The interior of the cooler shell is subjected to and kept under a pressure higher than atmospheric. This may be done in any suitable way. The preferred means is a volume of air under pressure imposed on the water body in said shell. I have herein indicated an air pump at 28, connected by a pipe 29 with the cooler chamber as a means of supplying air under pressure. 29' is a pressure gauge.

The cooker and the cooler are operated in unison as an organized unit by any suitable means. I have for illustration shown the following:

The shaft 30 to which, through the pulley 31, the power is led into the machine, drives, through the gearing indicated generally by 32, and the shaft 32', both the inlet and discharge valves of the cooker, and by the gearing 32" it drives the reel shaft 11 of the cooker. The shaft 30 is continued with the cooler and flexible coupling at 33, over the cooler and drives, by the gearing indicated at 34 and the shaft 34', the discharge valve 20 of the cooler and drives by the gearing 34" the reel 16 of the cooler.

The operation of my combined cooker and cooler is as follows:—The temperature and consequent pressure in the fluid tight cooker having been raised to the required point, the cans are fed in through the fluid tight inlet valve 4 and proceed through the cooker to the other end. Here they are taken by and through the discharge valve 5 and are delivered into the closed conduit 25, through which, in this case, the cans shown at 50 roll by gravity (though it is to be understood they may be otherwise positively conveyed) to the inlet 18 of the cooler. Passing through this inlet they are conveyed through the cooler which is at the proper cooling temperature and under the proper pressure and are delivered by and through the discharge valve 20 of said cooler.

It will now be seen, that the pressure in the cooker, and the pressure in the cooler are wholly independent, all interchange being intercepted and prevented by the fluid tight discharge valve 5 of the cooker. These pressures may, therefore, be provided for by any means suitable for either effect. In practice, I find for the cooker, the pressure of the steam generated and confined therein is the more practicable, and for the cooler, the compressed air is the more available. This separation of the pressure also yields the advantage of being able to regulate and vary the pressure in the cooler relatively to that in the cooker for in many cases it is not necessary or desirable to have the same pressure in both. The conditions are fulfilled if the pressure in the cooler be sufficient in any case to prevent such relief on the cans as might tend to make them open their seams, and this pressure can be independently regulated to suit. It will of course, be noted that the pressure in the cooler extends through its uncontrolled inlet 18 into and through the connecting tight conduit 25 back to its union with the casing 6 of the discharge valve 5 of the cooker, but there stops, so that the cans delivered from the cooker, and under the pressure therein and through said valve, are passed into the pressure in the conduit 25 and continue under such pressure through the cooler, so that they are not subject to injurious relief of pressure.

It is obvious, however, that while considering the essentiality broadly of the pressure blocking or separating valve 5 which in the form shown is the discharge valve of the cooker, it is nevertheless not essential that said blocking means shall be so located, for in its mere function as a means of preventing interchange of pressures it may be the inlet valve of the cooler in which case the closed conduit 25 would be under the pressure of the cooker instead of the cooler. It is also obvious that while the closed conduit 25 herein serves as a practical communication between the two members of the combined apparatus, said members may be more closely related in point of contiguity so that one might receive the containers directly through the pressure blocking transfer valve 5.

In large cookers the cans sometimes are moved endwise as much as 3,000 feet lineally, in traversing the spiral canways, and the wear on the ends of the cans is considerable, especially on heavy cans.

The chute 27 is so connected with the outlet of one tank and the inlet of the next tank, that the cans in passing through the chute from one tank to the other are reversed endwise; therefore while one end of each can is subjected to wear, in moving it endwise through the spiral canway in one tank, the can is reversed in passing through the chute, and its other end will be subjected to wear when traversing the canway in the succeeding tank. This reversal is desirable in order to equalize the wear.

I claim:—

1. A combined cooker and cooler comprising a cooking member and a cooling member; a spiral canway in each member; a rotatable reel in each member for moving cans through the canway; means for independently establishing and maintaining in each member a pressure above atmospheric; means for feeding cans one at a time successively into the cooking member; means for moving said cans in a single continuous line successively through the spiral canways in the members; a conduit for passing containers from one member to the other without interchange of pressures; and means for successively discharging the cans one at a time from the cooling member.

2. In a combined cooker and cooler as set forth in claim 1, the said feeding and delivery means each including a pressure tight valve for feeding cans one at a time successively into the cooking member, and for successively discharging the cans one at a time from the cooling member; and a fluid tight discharge valve in the cooking member whereby the containers are discharged into the conduit.

3. An apparatus for processing food products in hermetically sealed containers comprising a cooker and an associated cooler, means for admitting steam under pressure to the cooker and air under pressure to the cooler, a spiral canway in the cooker and a reel for propelling containers through said canway; a spiral canway in the cooler and a reel for propelling containers through the said canway; a valve controlled inlet for the admission of containers to the cooker; a closed valve controlled communication between the outlet of the cooker and the inlet of the cooler; and a valve controlled outlet for the cooler through which the containers are discharged and means for operating the reels and valves in proper relative time.

4. In combination a plurality of separate tanks; a reel and spiral canway in each tank, said tanks being disposed substantially end to end, and substantially coaxial with respect to each other; a common shaft disposed longitudinally of and exterior to said tanks, and connected through gear reductions to each of said reels for driving same in unison and an inclined can conduit connecting the outlet of one tank with the inlet of the next to enable cans to roll by gravity from the canway in one tank into the canway in the other tank.

5. In combination in a heat treating unit having a plurality of heat treating chambers disposed coaxially with respect to each other, a reel and spiral can conveying means in each of said chambers, an actuating shaft disposed parallel to said chambers and connected through gear reductions to each of said reels for driving the same in unison, and an inclined can way communicating at its receiving end with one of said treating chambers near the top thereof for the discharge of cans therefrom and at its lower end with the side of the adjacent treating chamber for delivering the cans thereto above the horizontal center of the reel therein.

6. In combination in a heat treating unit having a plurality of heat treating chambers disposed coaxially with respect to each other, a reel and spiral can conveying means in each of said chambers, an actuating shaft disposed parallel to said chambers and connected through gear reductions to each of said reels for driving the same in unison, and an inclined can way having one end curved and communicating substantially at the top of one of said treating chambers for the discharge of cans therefrom in a path at right angles to the reel and having its other end curved and communicating at one side of the adjacent treating chamber for feeding the cans thereto at right angles to the axis of the reel therein and above the horizontal center of the reel.

7. A heat treating unit, comprising a plurality of separate tanks; a spiral canway in each tank; a reel in each canway; a common shaft disposed longitudinally of and exterior to said tanks and connected through gear reductions from said shaft to each of said reels for driving same in unison; and an inclined can conduit connecting the outlet of one tank with the inlet of the other and through which conduit the cans roll by gravity from the canway in one tank into the canway in the other tank.

8. In combination a plurality of separated tanks; a spiral can path in each tank; said tanks being disposed substantially end to end, and substantially coaxial with respect to each other; and an inclined chute connecting the upper portions of the tanks and forming a continuation of and connection between the can paths, said chute being so formed and connected with the can paths in the respective tanks that the cans are reversed endwise in passing from one tank to the other.

9. A heat treating unit for cans and the like, comprising a plurality of separate tanks disposed substantially end to end, each having an inlet and an outlet; a spiral canway and coacting reel in each tank for moving cans from the inlet to the outlet thereof, the outlet of one tank being above the inlet of the next tank; and an inclined can conduit connecting the outlet of one tank with the inlet of the next tank and through which conduit cans roll by gravity from the canway in one tank into the canway in the next tank; said conduit being so formed and connected with the canways in the respective tanks that the cans are reversed endwise in passing from one tank to the next.

10. In combination a plurality of separate tanks; a reel and spiral canway in each tank, said tanks being disposed substantially end to end, and substantially coaxial with respect to each other; a common shaft disposed longitudinally of the exterior to said tanks, a set of gears connecting said shaft to each of said reels for driving the reels in unison; and an inclined can conduit exterior to the tanks connecting the outlet of one tank with the inlet of the next to enable cans to roll by gravity from the canway in one tank into the canway in the other tank.

11. In combination in a heat treating unit having a plurality of heat treating chambers disposed coaxially with respect to each other, a reel and spiral can conveying means in each of said chambers, an actuating shaft disposed parallel to said chambers, gearing between said shaft and each of said reels for driving the same in unison, and an inclined canway exterior to the tanks communicating at its receiving end with one of said treating chambers near the top thereof for the discharge of cans therefrom and at its lower end with the side of the adjacent treating chamber for delivering the cans thereto above the horizontal center of the reel therein.

12. In combination a plurality of separate tanks, a reel and spiral canway in each tank, said tanks being disposed substantially end to end, a can conduit connecting the discharge of one tank to the inlet of the next tank above the centers of the reels; and means for positively ejecting cans from the reel of the first canway into said conduit.

13. In combination a plurality of separate tanks, a reel and spiral canway in each tank, said tanks being disposed substantially end to end, and substantially coaxial, a shaft and gearing for driving the reels in unison; a can conduit connecting the outlet of one tank to the inlet of the next tank above the centers of the reels; and means for positively ejecting cans from the reel in the first tank into said conduit.

14. In combination in a heat treating unit having a plurality of heat treating chambers disposed coaxially with respect to each other, a reel and spiral can conveying means in each of said chambers, an actuating shaft disposed parallel to said chambers, a set of gears connecting said shaft to each of said reels for driving the reels in unison, and an inclined canway exterior to the tanks having one end curved and communicating substantially at the top of one of said treating chambers for the discharge of cans therefrom in a path at right angles to the reel and having its other end curved and communicating at one side of the adjacent treating chamber for feeding the cans thereto at right angles to the axis of the reel therein and above the horizontal center of the reel.

In testimony whereof I have signed my name to this specification.

ALBERT R. THOMPSON.